(12) United States Patent
Kennedy et al.

(10) Patent No.: US 7,581,852 B2
(45) Date of Patent: Sep. 1, 2009

(54) PORTABLE DEVICE FOR VIEWING AND IMAGING

(75) Inventors: Jeffrey P. Kennedy, San Juan Capistrano, CA (US); Alan P. Magerman, Blue Bell, PA (US); Stephen L. Maddox, Encinitas, CA (US)

(73) Assignee: Xenonics, Inc., Carlsbad, CA (US)

( * ) Notice: Subject to any disclaimer, the term of this patent is extended or adjusted under 35 U.S.C. 154(b) by 76 days.

(21) Appl. No.: 11/060,903

(22) Filed: Feb. 18, 2005

(65) Prior Publication Data

US 2005/0190550 A1 Sep. 1, 2005
US 2009/0175032 A9 Jul. 9, 2009

Related U.S. Application Data

(60) Provisional application No. 60/546,812, filed on Feb. 23, 2004.

(51) Int. Cl.
*F21V 33/00* (2006.01)
*G03B 29/00* (2006.01)

(52) U.S. Cl. .......................... 362/253; 362/8; 362/277; 362/458; 359/400; 396/429

(58) Field of Classification Search .................. 362/8, 362/253, 458; 396/61, 62, 175, 431, 176, 396/432; 250/330, 331; 313/524; 359/429, 359/822; D16/209, 212, 206
See application file for complete search history.

(56) References Cited

U.S. PATENT DOCUMENTS

| | | | | |
|---|---|---|---|---|
| 1,607,688 A | * | 11/1926 | Perrin et al. ................. | 359/429 |
| 3,509,344 A | * | 4/1970 | Bouwers ..................... | 250/333 |
| 3,752,983 A | * | 8/1973 | Yanez ......................... | 250/333 |
| 3,781,560 A | * | 12/1973 | DeBurgh et al. ............ | 250/333 |
| 3,833,805 A | * | 9/1974 | Naiman et al. .............. | 250/333 |
| 3,882,514 A | * | 5/1975 | Graham ....................... | 396/144 |
| 4,266,873 A | * | 5/1981 | Hacskaylo et al. .......... | 250/333 |
| 4,642,452 A | * | 2/1987 | Loy ..................... | 250/214 VT |
| 4,707,595 A | * | 11/1987 | Meyers ....................... | 250/333 |
| 4,794,246 A | * | 12/1988 | Kastendieck .......... | 250/214 VT |
| 4,896,218 A | | 1/1990 | Vick | |
| 5,113,177 A | | 5/1992 | Cohen | |
| 5,200,827 A | | 4/1993 | Hanson et al. | |
| 5,305,033 A | * | 4/1994 | Takahashi et al. ........... | 396/176 |
| 5,383,200 A | * | 1/1995 | Barrett et al. ......... | 250/214 VT |
| 5,396,069 A | * | 3/1995 | Craig et al. ........... | 250/214 VT |

(Continued)

FOREIGN PATENT DOCUMENTS

GB 2 166 259 A 4/1986

(Continued)

*Primary Examiner*—Ismael Negron
(74) *Attorney, Agent, or Firm*—Howard IP Law Group, P.C.

(57) ABSTRACT

A portable searchlight with a focused beam operating both in the infrared and visible portions of the spectrum with a range of approximately 400 meters includes telescopic lens system integrated with an illumination system. The beam of the searchlight and the telescopic lens are automatically aligned to both focus on the distant object. The telescopic lens system is combined with a digital camera system and an LCD display. The searchlight includes an eyepiece lens enabling an user to choose either viewing a display screen or using the eyepiece lens to optically observe the field of view.

31 Claims, 2 Drawing Sheets

U.S. PATENT DOCUMENTS

| | | | |
|---|---|---|---|
| 5,408,359 A | 4/1995 | Ferrett et al. | |
| 5,471,374 A * | 11/1995 | Palmer | 362/191 |
| 5,594,254 A * | 1/1997 | Palmer | 250/504 R |
| 5,729,016 A | 3/1998 | Klapper et al. | |
| 5,815,126 A | 9/1998 | Fan et al. | |
| 5,943,174 A | 8/1999 | Bryant et al. | |
| 5,949,582 A | 9/1999 | Coombs | |
| 6,116,744 A | 9/2000 | Batterman | |
| 6,178,297 B1 * | 1/2001 | Ting | 396/431 |
| 6,388,707 B1 | 5/2002 | Suda | |
| 6,538,820 B2 | 3/2003 | Fohl et al. | |
| 6,560,029 B1 | 5/2003 | Dobbie et al. | |
| 6,570,147 B2 | 5/2003 | Smith | |
| 6,603,507 B1 | 8/2003 | Jiang et al. | |
| 6,614,606 B2 | 9/2003 | Jones | |
| 6,850,703 B2 * | 2/2005 | Miyazaki et al. | 396/177 |
| 6,877,878 B2 * | 4/2005 | Raskas | 362/253 |
| 6,925,254 B2 * | 8/2005 | Kato et al. | 396/177 |
| 2002/0030163 A1 | 3/2002 | Zhang | |
| 2002/0122302 A1 | 9/2002 | Palmer | |
| 2003/0015662 A1 | 1/2003 | Yang et al. | |
| 2003/0137834 A1 * | 7/2003 | Jigamian et al. | 362/205 |
| 2005/0057801 A1 * | 3/2005 | McWilliams | 359/399 |
| 2007/0246641 A1 | 10/2007 | Baun | |

FOREIGN PATENT DOCUMENTS

| | | |
|---|---|---|
| WO | WO 03/096216 A1 | 11/2003 |

\* cited by examiner

PORTABLE DEVICE FOR VIEWING AND IMAGING

RELATED APPLICATIONS

The present application is related to U.S. Provisional Patent Application, Ser. No. 60/546,812, filed on Feb. 23, 2004, which is incorporated herein by reference and to which priority is claimed pursuant to 35 USC 119. This appication also claims priority to U.S. patent application Ser. No. 10/414,936, entitled APPARATUS AND METHOD FOR OPERATING A PORTABLE XENON ARC SEARCHLIGHT, filed Apr. 14, 2003, now U.S. Pat. No. 6,896,392, which is a division of U.S. patent application Ser. No. 09/440,105, entitled APPARATUS AND METHOD FOR OPERATING A PORTABLE XENON ARC SEARCHLIGHT, filed Nov. 15, 1999, now U.S. Pat. No. 6,702,452, the entire disclosures of which are hereby incorporated by reference as if being set forth in their entireties herein.

BACKGROUND OF THE INVENTION

1. Field of the Invention

The present invention pertains generally to illuminating optical systems, AND more particularly, to a nighttime, long-range, portable illuminating device having an integrated telescopic imaging and viewing systems.

2. Description of the Prior Art

Handheld lighting devices with focused beams or spotlights or searchlights, whether battery-powered or line-powered, are commonly used by military, law enforcement, fire and rescue personnel, security personnel, hunters and recreational boaters among others for nighttime surveillance in any application where a high intensity spotlight is required. The conditions of use are highly varied, but generally require the light to deliver a desired field of view at long distances, be reliable, durable and field maintainable in order for it to be practically used in the designed applications. Typically the light is hand carried and must be completely operable using simple and easily access manual controls which do not require the use of two hands.

In prior art xenon short-arc searchlights or illumination systems, whether handheld, portable or fixed mounted, the luminance distribution of the arc has been positioned facing in the direction of the beam (cathode to the rear), to provide a uniform beam pattern when the arc is at the focal point of the parabolic reflector. When the luminance distribution of the arc is positioned in this manner, a majority of the light output is collected in the low magnification section of the reflector and in a slightly divergent manner in the far-field. When the beam is diffused into a flood pattern, a large un-illuminated area or "black hole" is projected. Reversing the lamp position so that the full luminance distribution of the arc is in the high magnification section of the parabolic reflector produces a more concentrated beam in the near- and far-field and hence greater range can be achieved. Additionally, when the beam is diffused into a flood pattern no characteristic "black hole" of prior art configurations is produced. When the arc is moved slightly beyond (or slightly rearward of) the reflector's focal point, the combination of a placing all available light in the high magnification section of the reflector and collecting it in a slightly convergent manner produces roughly twice the operating range as a conventional anode-forward device.

A device which remedies the foregoing limitations, but which is still only an illumination unit with no enhanced viewing components is shown in Jigamian, U.S. Pat. No. 6,702,452 (2004), and U.S. Patent Applications 20050007766 (2005), 20040042211 (2004), 20040027824 (2004), which are incorporated herein by reference.

Telescopic viewing systems also employing imaging and night vision capability are well known. However, a need exists, especially in military and law enforcement applications, for a long-range, portable system capable of illuminating and observing objects at a range of approximately 400 meters and farther, using visible or infrared illumination and for providing for the possibility of image real time processing in the portable illumination unit.

BRIEF SUMMARY OF THE INVENTION

In one aspect, the invention is a compact device that can illuminate objects much farther than the eye can see or reliably resolve. The ability to clearly observe a scene at ranges of approximately 400 meters and farther at nighttime or in low-light conditions or other situations of impaired visibility gives the user a significant operational advantage. It is contemplated that such a system will be beneficial in military, law enforcement, border-patrol, security, and maritime vessel applications, and other applications where a portable, compact device of this kind is desired.

Separate systems for illuminating from a great range while simultaneously observing using a different apparatus, such as a telescopic viewing and imaging system, can be cumbersome, unwieldy and difficult to operate. One particular problem is finding and maintaining alignment and focus on a particular object that is separately illuminated by another system. Other advantages become apparent particularly in infrared illumination applications. More specifically, focusing with infrared light requires more precise alignment angles for a lamp and a lens as just a couple of degrees difference will result in a loss of a large amount of available light energy.

The present invention is also characterized as a compact, handheld, portable device that can illuminate objects at distances greater than the naked eye can reliably see. The device further provides illumination in either the visible spectrum or infrared spectrums. A telescopic lens system integrated with the illumination system has sufficient capability to view objects from a great distance in both the visible and infrared spectrums. The telescopic lens system can alternatively be applied to a digital camera system. More specifically, the digital camera system may contain an image sensor, such as a charge-coupled device (CCD), and a means to display an image such as a LCD display. The invention alternatively includes an eyepiece lens such that a user may choose to view a display screen or use the eyepiece lens to optically observe the field of view. Because the image is digital, the invention allows for the possibility of real time imaging processing in the portable device, so that the displayed image can be artificially enhanced according to the control of the user to optimize visualization of the image or a selected part thereof. The invention also includes the ability to transmit image data to remote receivers as part of a wireless battlefield.

The device of the present invention has a light source or a lamp, such as a xenon arc lamp or other plasma lamp; or alternatively the device comprises a high intensity discharge lamp (HID) such as a mercury vapor, metal halide or high pressure sodium lamp. The device of the invention is further characterized in that light energy is produced from a highly concentrated plasma ball, or illumination source, and precisely radiated about a reflector's optical axis of symmetry, wherein light waves can achieve great illumination distances. Alternatively, if a plasma lamp is used, the plasma lamp will have circuitry associated with it to obtain proper voltages for creating and maintaining a glowing plasma. Also, the device including the lamp will have a mechanical configuration including a lamp holder that allows for relatively quick replacement in the field while maintaining the precise alignment necessary for long-range operation.

Also, the lamp is mounted within the searchlight so that the anode of the lamp is in the rearward position relative to the direction of a beam projected by the searchlight so that the field of illumination of the beam is slightly convergent and more concentrated and therefore delivers a much longer range of operation. This configuration will prevent the "black hole" effect associated with other configurations such as cathode to the rear.

The device of the invention further includes a telescopic sight having one or more objective lenses. It is contemplated that one objective lens could be used for both visible light and infrared applications or separate lenses provided depending on the application. The device of the invention also includes other optical elements as needed for focusing and collimating light. The searchlight can be highly collimated to deliver a useful spotlight over a mile away. According to one embodiment, an eyepiece is employed by a user to view an image plane. In an alternative embodiment, an image sensor such as a charge-coupled device (CCD) having a pixel array is employed. The image sensor will accumulate pixel data as electrical charge and transfer the pixel data to storage locations during a frame cycle. Additional circuits will convert the pixel data to a video signal that can be displayed on a video screen of the device. The video signal may also be transmitted to remote locations. The image sensor will either solely produce monochrome images or color signals may be constructed from the image sensor.

In yet another aspect, the present invention may be characterized as a compact self-contained device having illuminating, telescopic viewing and imaging capabilities, the device comprising: a searchlight housing having a top portion and a side portion; a view finder having an eyepiece and having an adjustable position with respect the searchlight housing, wherein the view finder is pivotable about a position with respect to the top portion of the searchlight housing. In this manner, the view finder has a stowed position and an adjustable deployed position. The device also includes a video display having an adjustable position with respect the searchlight housing, wherein the video display is pivotable about a position with respect to the side portion of the searchlight housing; and a telescopic lens assembly integrally connected to the searchlight housing, wherein the telescopic lens is configured to receive light from a distant scene that is illuminated by the device.

The device of the invention optionally provides that the view finder, video display and the telescopic lens assembly are modular components for ease of manufacture and replacement of the components. As in other embodiments described herein, telescopic lens assembly is capable of magnifying objects in the distant scene up to approximately 20× and farther. The video display may alternatively be an LCD display. A filter may also be provided, positioned forward of the searchlight housing for blocking wavelengths of light up to infrared wavelengths, namely a low pass filter with a cutoff at the visible frequency and higher. In this way the device becomes an infrared searchlight and telescope.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DESCRIPTION OF THE PREFERRED EMBODIMENTS

Figure 1A:
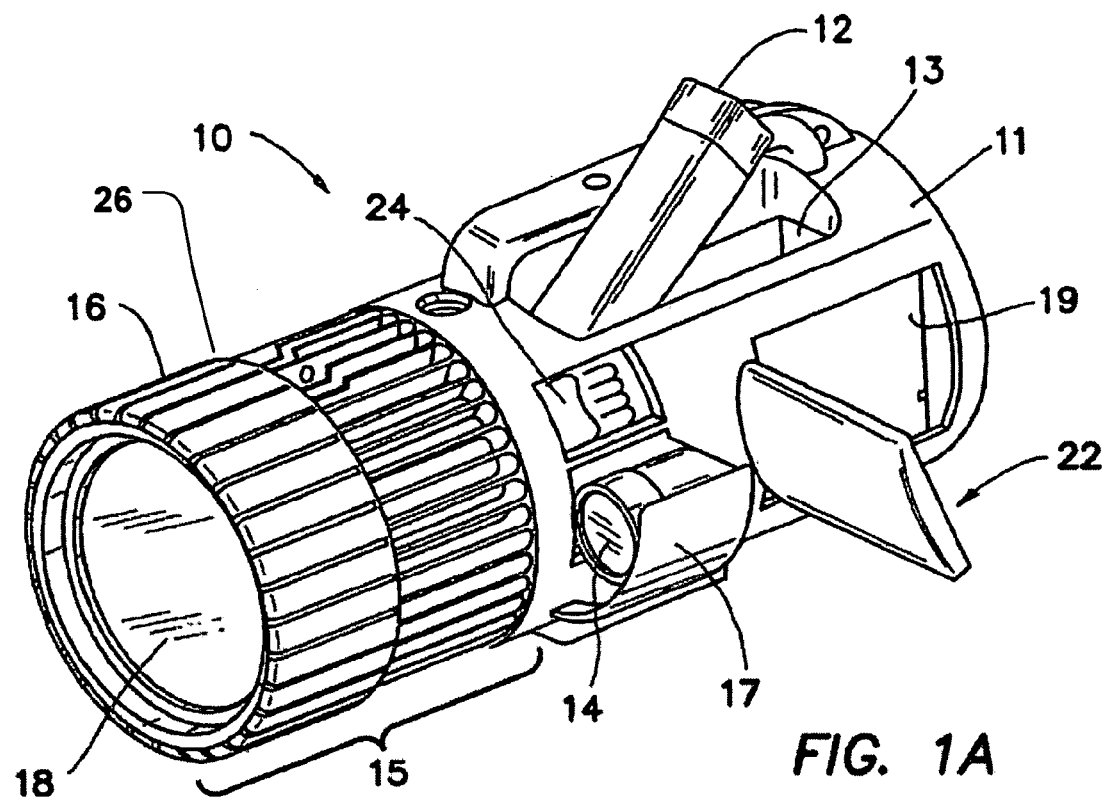
FIG. 1A is a front perspective view of the searchlight as seen from the front left side of the searchlight and showing the viewing components deployed for operation.
Figure 1B:
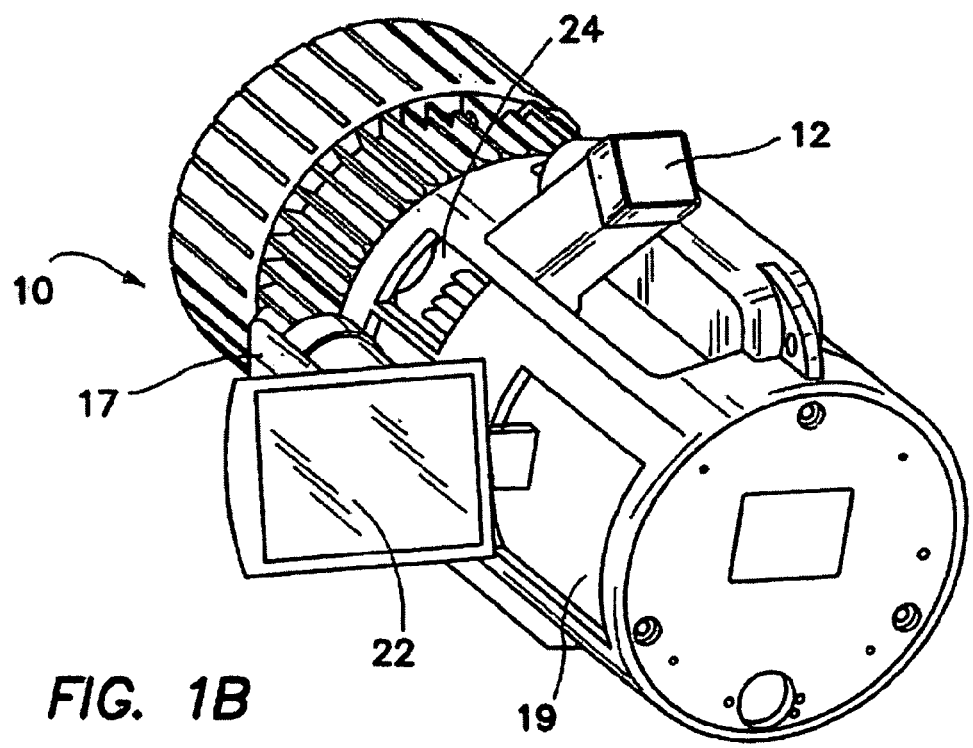
FIG. 1B is a rear perspective view of the searchlight as seen from the front left side of the searchlight and showing the viewing components deployed for operation.

Now referring to FIGS. 1A and 1B, a compact, handheld device 10 of a preferred embodiment of the present invention is illustrated in front and rear perspective view. Eyepiece viewer 12 has a deployed and a stowed position, which is shown in FIGS. 1A and 1B in the stowed position. Eyepiece viewer 12 is optically coupled to the telescopic lens assembly 14 and can be rotated upward to be deployed at a user-selected angle of convenience or rotated downwardly to lie in a flush configuration within a receiving cavity 13 defined in body 11 of device 10. The actual image which is being optically received by telescopic lens assembly 14 can be directly viewed by the user through eyepiece viewer 12.

Similarly, telescopic lens 14 has deployed and stowed positions. Lens assembly 14 rotates out of a cavity 24 defined in body 11 for flushly receiving lens assembly 14 as a protective door 17 also moves or rotates out. The mechanical linkage by which such movements can be realized are conventional and not further detailed here. Lens assembly 14 will be forwardly directed when deployed and will be substantially aligned with or parallel to the optical axis of illumination head 26 or the beam of the device 10. Although lens assembly 14 will be normally aligned to coincide with the beam position at the preferred range, e.g. 400 m, it is to be understood that other ranges can be accommodated and a mechanism to allow variable alignment of lens assembly 14 in the field to virtually any beam position can be provided using ordinary design principles and modifications.

Lamp housing 15 contains a lamp and reflector apparatus internally (not shown). Rotatable bezel 16 is used to vary the beam spread of the illumination device of the present invention by effecting relative movement of the reflector with respect to the light source within lamp housing 15. The details of lamp housing 15 and its lamp and reflector apparatus are detailed in the incorporated U.S. Pat. No. 6,702,452 (2004), and U.S. Patent Applications 20050007766 (2005), 20040042211 (2004), 20040027824 (2004). Filter 18 is mounted in bezel 16 and is selectively included to filter out undesired wavelengths of light, e.g. to provide an infrared beam only or other selected portion or portions of the spectrum.

Video display 22 allows the user to selectively view an image scene or a selected portion of the scene captured by lens assembly 14. Video display 22 also has deployed and stowed positions. Display 22 rotates out of a conforming cavity 19 defined in body 11 of device 10, which allows display 22 to remain flushly within the envelope of body 11 for protection and storage. When deployed, display 22 swings out from body 11 and can be oriented on a conventional swivel connection to be angularly inclined at an arbitrary user-selected angle for convenient viewing. Display 22 may be any type of video display now known or later devised, including LCD, plasma displays, or LED displays.

Figure 2:
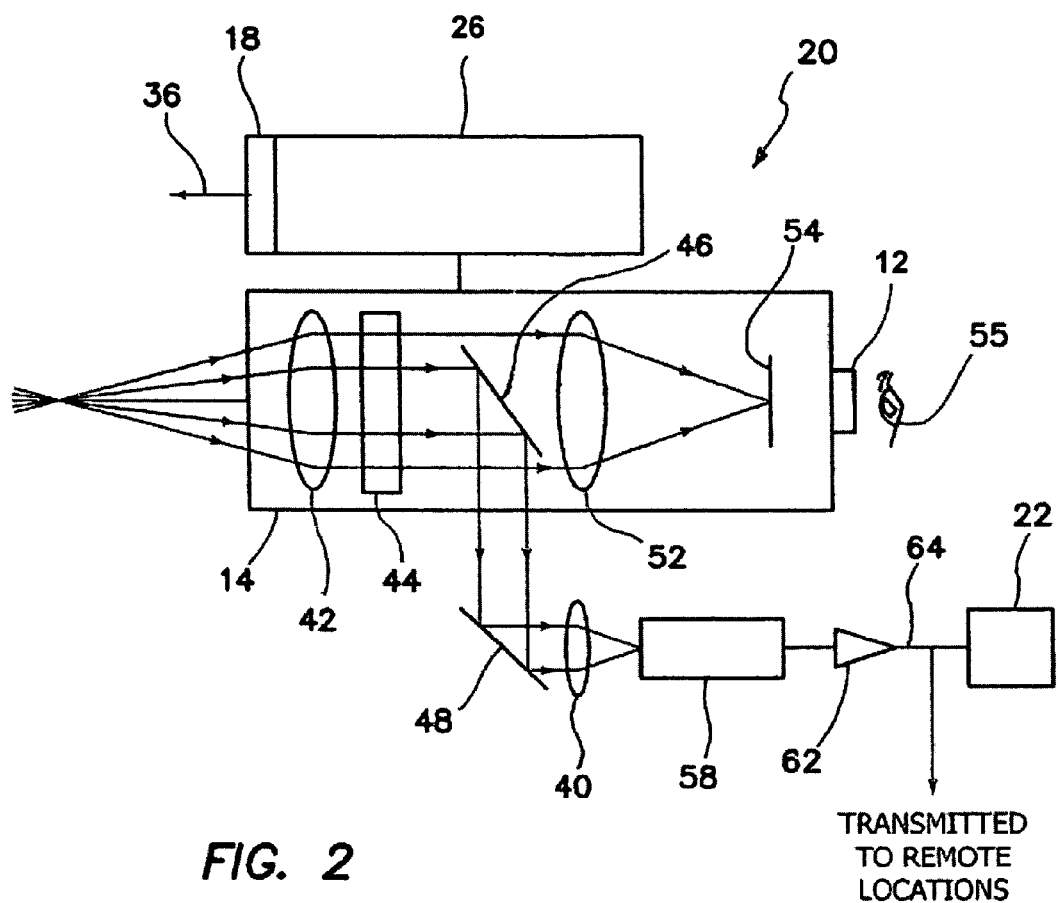
FIG. 2 is a schematic block diagram of the viewing and display portions of the system of the present invention capable of long-range illumination and observation.

Referring now to FIG. 2, a simplified schematic of a circuit 20 of the present invention is shown. Illumination head 15 has an optical filter 18 and projects a high intensity beam 36 of light. System 20 may be combined with separate or interchangeable telescopic lens assemblies 14 for infrared and visible light; or a single lens assembly 14 can be configured to handle both modes. Lens assembly 14 has objective lens 42 and collimating lens 44, as well as focusing lens 52. Although single lenses have been reference, it must be expressly understood that lens assemblies can be employed in each case and that the optical arrangement in device 10 can be readily modified to assume other configurations according to conventional design choices.

A user 55 can view the distant scene focused on image plane 54 through eyepiece 12. Partially silvered mirrors 46 and 48 are used to send the image to a collecting lens 40 and detector or charge coupled device 58, which is employed to capture a two dimensional image. In the event that device 58 is an analog imaging camera, its output may be coupled to analog-to-digital converter 62. A video output 64 from converter 62 is produced that may be transmitted by other appropriate digital transmission equipment to remote locations. The video signal may also be bidirectional so that the same digital transmission equipment coupled to device 10 could receive information, including graphic information from a remote site and display the same on display 22. The reconstructed digital image captured by lens assembly 14 is viewed on video display 22.

It must be understood that additional circuitry may be included to process the digital image produced by detector 58 and/or converter 62. In the case of an infrared image, the only image which will be visible will be displayed on display 22 after being converted into a visible video signal by display 22. Display 22 or detector 58 may include circuitry or digital processing capability according to well known conventional principles to select, edit, enhance or reduce various aspects of the received visual image. For example, false coloring of an image to represent the temperature of various portions of the image or false coloring to exaggerate the contrast of some portions with surrounding portions can readily be included. In addition, variable electronic magnification or zoom can be added to the variable optical magnification of lens assembly 14 subject to user control. Motion detection of the image can also be included, whereby any portion of the image which is moving relative to other portions of the surrounding image is highlighted or falsely colored to be readily visually identified.

Although in one embodiment image processing is contemplated as being performed in real time in the device 10, it is also within the scope of the invention, where output 24 is bidirectional, that image processing can be performed at a remote station and then returned in modified form to device 10. Such remote image processing may include selective mixing with other images derived from other devices 10 in the field or combined with information generated or collected at the remote site. In such a situation, display 22 could be modified to be an input/output device, such as a touch screen. In this manner the displayed scene on display 22 from wherever it may be derived, allows for interactive input by the user in the field. The remote fire control command center may, for example, process the image from device 10 for suspected targets, one or several of which will then be selected by touching the screen by the user in the field, which selection is then communicated back to the remote fire control command center, which in turns directs appropriate fire control to other units in the theater. Device 10 can thus be used in this manner of one of many interactive detection and input devices in an integrated battlefield fire control system.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims: For example, notwithstanding the fact that the elements of a claim are set forth below in a certain combination, it must be expressly understood that the invention includes other combinations of fewer, more or different elements, which are disclosed in above even when not initially claimed in such combinations.

While the particular Portable Long-range Searchlight with Telescopic Viewing and Imaging Systems as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. A portable hand-held device having illuminating, telescopic viewing and imaging capabilities comprising: a searchlight comprising a light source and a reflector, the reflector being movable relative to the light source, for illuminating a scene at a predetermined range of distances determined by the relative position of the reflector and the light source and having a hand-held body, the searchlight being within the body, the body having a lens assembly receiving cavity and a video screen receiving cavity defined therein; an optical telescopic viewing system comprising a lens assembly to generate an optical image of the scene, which optical telescopic viewing system is integrally included with the hand-held body, the lens assembly being selectively movable independent of the searchlight between a deployed configuration and a stored configuration within the lens assembly receiving cavity; and an image sensing and display system for receiving the optical image of the scene and generating an electronic image therefrom, which image sensing and display system is integrally included with the hand-held body and comprises an alternatively usable video screen for simultaneously viewing an image optically obtained by the optical telescopic viewing system and converted to a digital format by the image sensing and display system video display, the video screen being selectively movable between a deployed and a stored configuration within the video screen receiving cavity of the hand-held body.

2. The portable device of claim 1 wherein the telescopic viewing system can accurately focus on objects with a magnification of approximately 20 times or greater.

3. The portable device of claim 1 wherein the telescopic viewing system focuses light from the predetermined range along an optical axis of the telescopic viewing system and collimates the light from the predetermined range, and wherein the optical axis of the telescopic viewing system is accurately adjusted to the beam location at the predetermined range.

4. The portable device of claim 1 wherein the searchlight, the optical telescopic viewing system and the image sensing and display system are simultaneously operable at wavelengths in the visible portion and infrared portion of the spectrum.

5. The portable device of claim 1 wherein the image sensing and display system generates color image data.

6. The portable device of claim 1 wherein the image sensing and display system comprises a solid-state dual mode camera, capable of selectively constructing images either in color or monochrome.

7. The portable device of claim 1 further comprising a circuit for digital imaging processing the electronic image.

8. The portable hand-held device of claim 1 where the searchlight has a defined beam to provide long-range illumination at the predetermined range of distances and further comprising circuitry to generate a digital image signal in order to provide in combination with the optical telescopic viewing system a focused imaging at the illuminated predetermined range of distances.

9. The portable hand-held device of claim 8 where the digital image signal is provided as an output signal for transmission to a remote recipient.

10. The portable device of claim 1 wherein the optical telescopic viewing system comprises an eyepiece for viewing an image optically obtained by the optical telescopic viewing system.

11. The device of claim 10, wherein said eyepiece has a deployed configuration and a stored configuration, and said body has an eyepiece receiving cavity, the eyepiece being received in said eyepiece receiving cavity when in said stored configuration.

12. A hand-held device for illuminating and imaging a distant object comprising: a high intensity searchlight for delivering a focused spotlight beam at a predetermined range of distances, the searchlight having a light source and a reflector, the reflector being movable relative to the light source to determine the predetermined range of distances, and a hand-held body; an optical telescope integrally mounted on the hand-held body and selectively movable between a deployed configuration and a storage configuration within the hand-held body for receiving a reflected image from the focused spotlight beam at the predetermined range of distances; and an electronic display for generating a digital image from the received reflected image at the predetermined range of distances, the electronic display integrally mounted on the hand-held body and selectively movable between a deployed configuration and a storage configuration within the hand-held body.

13. The device of claim 12 further comprising an optical viewfinder optically coupled to the telescope, the viewfinder integrally included on or within the hand-held body and selectively movable between a deployed configuration and a storage configuration within the hand-held body.

14. The device of claim 12 where the optical telescopic and the searchlight are automatically focused on the same distant object.

15. The device of claim 12 where the digital image is provided by the electronic display as an output signal for transmission to a remote recipient.

16. The device of claim 12 wherein the telescope has a magnification of approximately 20 times or greater.

17. The device of claim 12 wherein the searchlight, the telescope and the electronic display are simultaneously operable at wavelengths in the visible portion and infrared portion of the spectrum.

18. The device of claim 12 further comprising a circuit for digital imaging processing the electronic image.

19. A portable device having illuminating, telescopic viewing and imaging capabilities, the device comprising: a searchlight housing having a searchlight therein, the searchlight comprising a light source and a reflector, the reflector being movable relative to the light source; a telescopic lens assembly integrally connected to the searchlight housing, wherein the telescopic lens assembly is movable with respect to the searchlight housing and wherein the telescopic lens is configured to receive light directly from a distant scene that is illuminated by the searchlight and to form an optical image thereof when deployed and wherein the telescopic lens assembly is configured to be received within the searchlight housing when stowed; a view finder having an eyepiece optically coupled to the telescopic lens assembly and having an adjustable position with respect to the searchlight housing, wherein the view finder is pivotable independently of the telescopic lens assembly about a position with respect to the searchlight housing and wherein the view finder is configured to be received within the searchlight housing when stowed; a video display optically coupled to the telescopic lens assembly and generating an electronic image, the video display having an adjustable position with respect to the searchlight housing, wherein the video display is pivotable independently of the telescopic lens assembly about a position with respect to the searchlight housing and wherein the video display is configured to be received within the searchlight housing when stowed.

20. The portable device of claim 19 wherein the view finder, video display and the telescopic lens assembly comprise modular interchangeable components for ease of manufacture and replacement of the components.

21. The portable device of claim 19 wherein the telescopic lens assembly is capable of magnifying objects in the distant scene up to approximately 20 times or greater.

22. The device of claim 19, wherein said searchlight housing has an eyepiece receiving cavity, a video display receiving cavity, and a telescopic lens assembly receiving cavity.

23. A portable, hand-held digital night vision camera and viewer, comprising:
  a housing;
  a light generator within the housing, the light generator emitting at an output of the housing a high intensity infrared (IR) only light beam directed so as to illuminate a target scene;
  a lens assembly mounted on the housing, the lens assembly receiving IR light returned from the target scene illuminated by the light generator, the lens assembly focusing the received IR light and providing a focused IR signal;
  a charge coupled device (CCD) within the housing responsive to the focused IR signal from the lens assembly and providing monochrome output IR image data indicative of the focused IR signal;

signal processing circuitry within the housing responsive to the IR image data and providing an output video signal; and a display mounted on the housing that receives the output video signal and displays a visible monochrome image of the target scene to a viewer.

24. The apparatus of claim 23, wherein the signal processing circuitry comprises variable electronic magnification of the image.

25. The apparatus of claim 23, wherein the lens assembly is capable of magnifying objects in the target scene up to approximately 20 times.

26. The apparatus of claim 23, wherein the signal processing circuitry is adapted to cause any portion of an image which is moving relative to other portions of the image to be highlighted or falsely colored.

27. The apparatus of claim 23, wherein the high intensity IR only light beam is directed so as to impinge and illuminate a target scene at a range located 400 meters or farther from the housing.

28. The apparatus of claim 27, wherein the lens assembly is aligned to coincide with the position of the IR beam at the range of the target scene.

29. The apparatus of claim 23, wherein the light generator comprises a lamp and a filter for blocking wavelengths of light up to IR wavelengths mounted on the housing forward of the lamp.

30. The apparatus of claim 29, wherein the lamp is a xenon or metal halide arc lamp.

31. The apparatus of claim 29, wherein the light generator further comprises a reflector.

* * * * *